United States Patent
Cline et al.

[11] Patent Number: 5,900,880
[45] Date of Patent: May 4, 1999

[54] 3-D SURFACES GENERATED FROM A LIST OF CUBIC ELEMENTS

[75] Inventors: Harvey Ellis Cline, Schenectady; William Edward Lorensen, Ballston Lake, both of N.Y.

[73] Assignee: General Electric Company, Schenectady, N.Y.

[21] Appl. No.: 08/613,811

[22] Filed: Mar. 6, 1996

[51] Int. Cl.$^6$ ................................................ G06T 15/10
[52] U.S. Cl. ........................ 345/423; 345/424; 345/427
[58] Field of Search ........................... 395/124, 127; 345/424, 427, 423

[56] References Cited

U.S. PATENT DOCUMENTS

| | | | |
|---|---|---|---|
| 4,710,876 | 12/1987 | Cline et al. | 345/423 |
| 4,719,585 | 1/1988 | Cline et al. | 345/424 |
| 4,985,834 | 1/1991 | Cline et al. | 395/124 |

*Primary Examiner*—Mark K. Zimmerman
*Attorney, Agent, or Firm*—Marvin Snyder; Douglas E. Stoner

[57] ABSTRACT

A system for display of interfaces within a block of raw data values comprises a model building portion groups data points into a cubes, receives a threshold and identifies cubes which a vertex data values which straddle the threshold. These are surface cubes. Gradient vectors for each vertex of each cube are determined by comparing the change in data values in three dimensions in a neighborhood around each vertex. The surface cubes and their associated gradient vectors are stored as a cube/vector model. his model may be tessellated and then displayed by conventional CAD/CAM workstations. A second display system is shown which employs a modified "Dividing Cubes" method to subdivide the cubes, interpolate each to a center point and associated vector, then backprojected to produce perspective.

2 Claims, 2 Drawing Sheets

3-D SURFACES GENERATED FROM A LIST OF CUBIC ELEMENTS

BACKGROUND OF THE INVENTION

1. Field of the Invention

This invention relates to a system for creating computer graphic models and rapidly displaying the models.

2. Description of Related Art

Systems have been described which start with a block of volumetric data such as that acquired from a medical imaging system, determines interfaces between adjacent data values indicating a change in the measured value, and then models the surfaces with triangular elements having a vector normal to the surface at each of the vertices of the triangle. This is described in the "marching cubes" patent, U.S. Pat. No. 4,710,876 "System And Method For The Display Of Surface Structures Contained Within The Interior Region Of A Solid Body" by Harvey E. Cline and William E. Lorensen, issued Dece. 1, 1987. Thresholds are used to determine significant changes between adjacent values in the volumetric data which indicate movement across surfaces. These surfaces are saved as a computer model which may be displayed at some later time when a viewing angle is selected. The surfaces are shaded relative to a viewpoint and therefore are dependent upon the viewpoint chosen.

This model provides perspective views of the model data and provides realistic images of the surfaces. It, however, is computationally intensive to convert the lists of triangles and normal vectors into surfaces during display time.

Another method as described in the "dividing cubes" patent, U.S. Pat. 4,719,685 "Dividing Cubes System And Method For The Display Of Surface Structures Contained Within The Interior Region Of A Solid Body" by Harvey E. Cline, William E. Lorensen and Siegwalt Ludke, issued Jan. 12, 1988, describes another method of displaying volumetric data. Again, changes between adjacent data values are monitored in order to find changes above a specific threshold which indicate an interface in the data. All interface points throughout the data block are identified, then converted to a number of points with the pixel coarseness of an image desired to be displayed. A normal vector for each of the surface points on the model is determined and associated with each point. Each point, its location and three-dimensional space, and its normal vector are stored as a point/normal model to be displayed during display time.

During display time a viewpoint is determined and the component of each normal vector pointing towards the viewpoint is used to shade each of the points of the surface to result in an image. This image may be rapidly displayed once a viewpoint is selected, however due to the nature in which the model is created, the coarseness of the model is the same at points near an image plane as well as that far from the image plane. This results in an image having no perspective.

It is important to note that it is very desirable to have a computer model which is transportable, that is to say, may be displayed easily on one type of computer graphic display, or moved to a different type of computer graphic display and also be displayed on that system. Being that the model of the marching cubes system is a "wire mesh" model and is incompatible with the system used to display the "point/normal" model as described in the dividing cubes patent, and vice versa. Therefore, the models would not be interchangeable, and would have to be generated from scratch for each of the two systems. Also it must be noted that CAD/CAM systems typically display models which are stored in the model format of the marching cubes system.

Therefore there is a need for a computer graphic system which produces a model which is transportable, and may be rapidly displayed.

SUMMARY OF THE INVENTION

A system for display of interfaces within a block of raw data values at defined locations employs a threshold comparison device that receives the raw data values and compares them to a threshold and identifies the data values above the threshold and those which are below the threshold.

A surface cube identification device receives the output of the threshold comparison device, and groups adjacent data values into a cube, identifies cubes straddling the threshold and stores the surface cubes and their locations in the model cube memory for later use.

A gradient vector calculation device receives the raw data values, the surface cubes and their locations, and computes a change between data values in the vicinity of the vertex of each surface cube to result in gradient vectors for all vertices of all surface cubes, and stores the gradient vectors associated with each vertex in the model cube memory as a cube/vector model.

A display device coupled to the model cube memory functioning to display the cube/vector model as a surface representing said interface. This display device may be a tessellation device which puts the cube/vector model into a polygonal mesh form, and a CAD/CAM display device, capable of displaying models in polygonal mesh form.

A second type of display device performs a method similar to the "Dividing Cubes" method. Unlike the "Dividing Cubes" method, this display device functions to provide images with visual perspective.

The display device employs a distance calculation device which receives a viewpoint from which to view the model, an image plane location, and pixel size w from an operator. It calculates a distance of each cube from the viewpoint, a the degree of subdivision (granularity) of each cube.

A cube division/interpolation device subdivides each cube according to its granularity, reduces each subdivided cube to a center point, and interpolate the gradient vectors to result in a gradient vectors associated with each center point. These center points and associated vectors are stored in a point normal memory.

A perspective backprojection device creates a video signal from the center points and associated vectors representing a surface of the model as viewed from the viewpoint with perspective, and passes the video signal to a monitor which displays an image to an operator.

OBJECTS OF THE INVENTION

It is an object of the present invention to produce a computer graphic model which may be displayed by a number of different types of the computer graphic display systems.

It is another object of the present invention to provide a computer graphic system which rapidly displays surfaces with visual perspective.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

In computer graphics there are generally two steps, model building, and display. In the present system, the first step of model building involves starting with volumetric data, or a block of data, which is usually evenly spaced, but need not be, and represents some physical parameter to be modeled.

Figure 1:
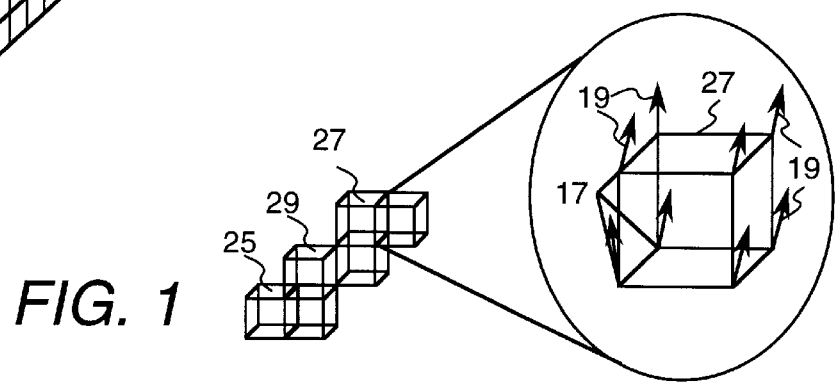
FIG. 1 is an illustration of the cubes and gradient vectors used to create a cube model which identifies an interface within a block of data.

In FIG. 1, eight data values 17 are used as vertices to define a cube. Cubes which straddle a surface are surface cubes and stored as cubes of the model. Surface cubes have at least one vertex below a threshold and at least one other vertices above the threshold. Interface are identified by a jump in data values above a predefined threshold. In the case of medical imaging, this may be the interface between two different types of tissue such as muscle and bone.

A gradient vector 19 for each vertex is determined by calculating differences in adjacent data values in all dimensions. Each difference results in a component of the gradient vector.

This is repeated for all vertices of surface cubes and stored as the cube/vector model.

During display, or playback, the cube/normal elements and the viewpoint are used in displaying surfaces with visual perspective.

Model Building

During model building the first step is to take each data value and compare adjacent data values to a defined threshold.

Figure 2:
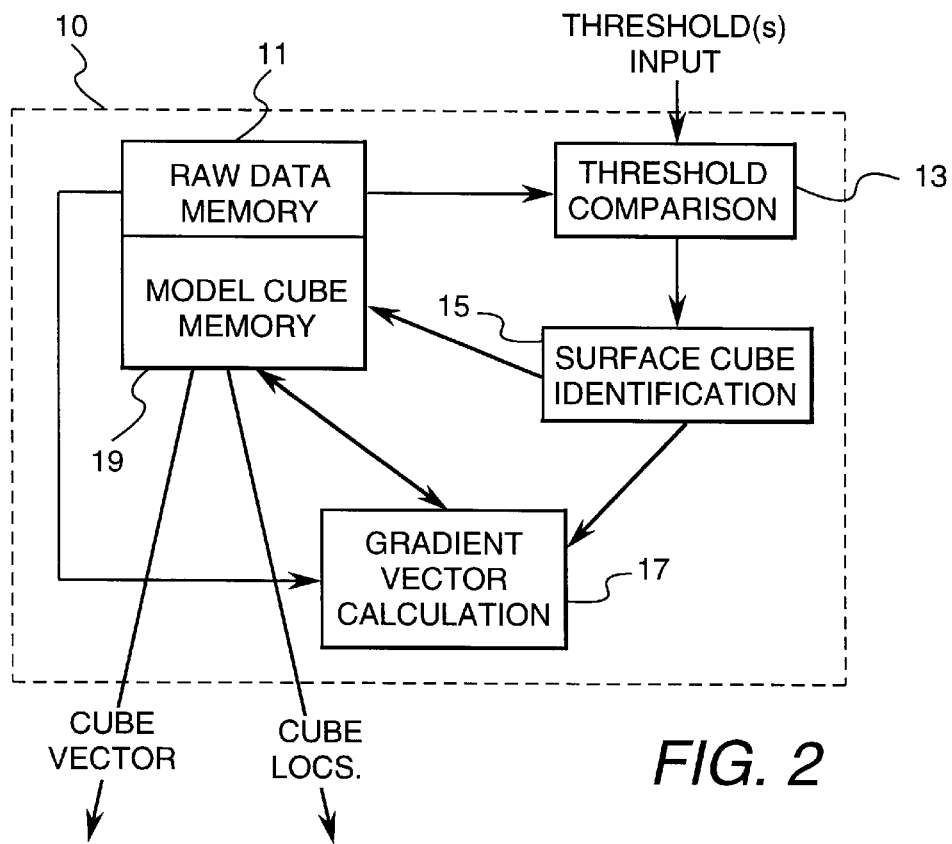
FIG. 2 is a simplified block diagram of the model creation portion of the present invention.

In FIG. 2, the apparatus 10 used to create a computer model is shown. Volumetric data is provided to the system which may be acquired from any one of many numerous different devices. This may be computed axial tomography (CAT), magnetic resonant imaging (MRI), SONAR, RADAR, or other types of volumetric data. This data may be stored in raw data memory 11 or may be provided directly to a threshold comparison device 13. Threshold comparison device 13 receives threshold inputs which may be predetermined or specified by an operator. One or more of these thresholds are used by threshold comparison device 13 to determine which values of the raw data are above and below the threshold or thresholds. This information is passed to a surface cube identification device 15. Surface cube identification device 15 takes eight adjacent values in the form of a cube shape and identifies cubes having values which straddle a threshold. For example, cubes having all values which are below the threshold which is being examined are considered inside a given material and is not a surface cube. Cubes having all data values which are above the threshold being measured are in a second material and also are not surface cubes. A cube having vertex values, some of which are above the threshold being examined and some below the threshold being examined, therefore are surface cubes since they straddle a surface.

Surface cube identification device 15 then stores the data values which are part of surface cubes in a model cube memory 20.

A gradient vector calculation device 17 either receives the surface cubes from the surface cube identification device 15, or reads them from model cube memory 20, and also receives the raw data from raw data memory 11, and determines gradient vectors at each of the corners of each surface cube, as shown in FIG. 2.

Gradient vectors are determined by subtracting a data value above the vertex from a data value below the vertex to determine one component of the gradient vector, subtracting the data value of a point in front of the vertex from a point behind the vertex to determine the second component and subtracting the value to the left of the vertex from the value of the right of the vertex all within the raw data block to determine the third components of the vector. These three components for each of the vertices of the surface cube are stored along with the surface cube data values in model cube memory 19. This surface cube model may be then displayed by a number of different display methods.

In the aforementioned "Dividing Cubes patent", each of the data cubes as shown in FIG. 2, is broken into smaller cubes and each of these cubes interpolated to produce new cubes which pertain to the size of the pixels of a desired image display. The small cubes are approximated by a center point and a normal vector and projected to the image plane to provide the imaging information for that pixel. One of the problems associated with these dividing cubes method was that it did not create images with visual perspective. Since an object which is close to the image plane appeared the same size as if the object were placed a larger distance from the image plane. In a three dimensional, real life world, objects which are at a larger distance from the viewer appear smaller than those which are closer. This is visual perspective.

Figure 3:
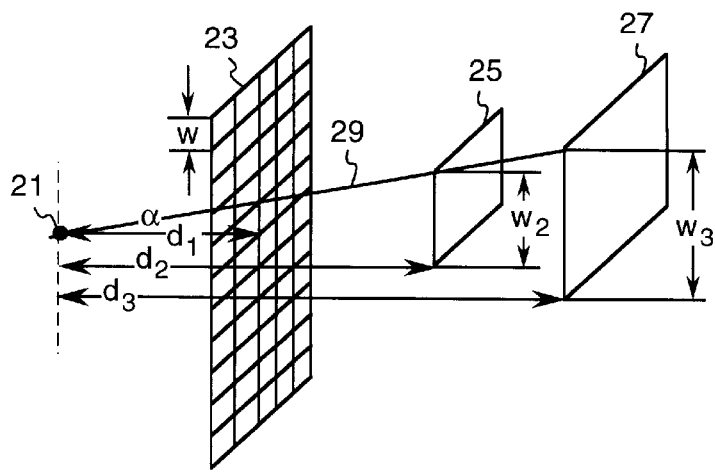
FIG. 3 is diagram illustrating the relative geometry of the model, viewpoint and image plane.

In FIG. 3, a viewpoint 21 is chosen to view a computer model. In this case, cubes 25 and 27 represent surface cubes of the model stored in model cube memory 19. Rays 29 passing from viewpoint 21 through image plane 23 and through model cubes 25 and 27 illustrate visual lines of perspective. Since cube 27 is at a greater distance from viewpoint 21 as compared with cube 25, cube 27 will affect a smaller number of pixels on image plane 23 than cube 25.

Therefore, in the dividing cubes method stated above, cubes 25 and 27 would be broken up into smaller cubes, each being the size of the pixels of image plane 23. This is only true if the image is to be drawn with no perspective.

If the image is to be drawn with perspective, cube 25 should be broken into a larger number of cubes as compared with the subdivisions of cube 27. Therefore, the granularity of cube 27 could be much larger than that of cube 25. This granularity can be determined by simple geometric relationships. If image plane 23 is perpendicular to a line passing through viewpoint 21 and image plane 23, and a pixel of width w is selected in the center of the image plane, it can be shown that the sign of the angle $\sin(\alpha) = 0.5 w/d_1$ where $d_1$ is the distance from the viewpoint to the image plane.

Similarly, $\sin(\alpha) = 0.5 w_2/d_2$ where $w_2$ is the width of the subdivided cube, and $d_2$ is the distance between subdivided cube and viewpoint 21. This results in:

$w_2 = d_2 * w/d_1$ and similarly, for cube 27 the granularity would be:

$w_3 = d_3 * w/d_1$ where $w_3$ is the width of the subdivided cubes for cube 27, and $d_3$ is the distance between cube 27 and viewpoint 21.

Therefore, it is now possible to subdivide the cubes of the model cube memory corresponding to the distance from the viewpoint in order to produce images which have perspective, unlike the "Dividing Cubes method".

Figure 4:
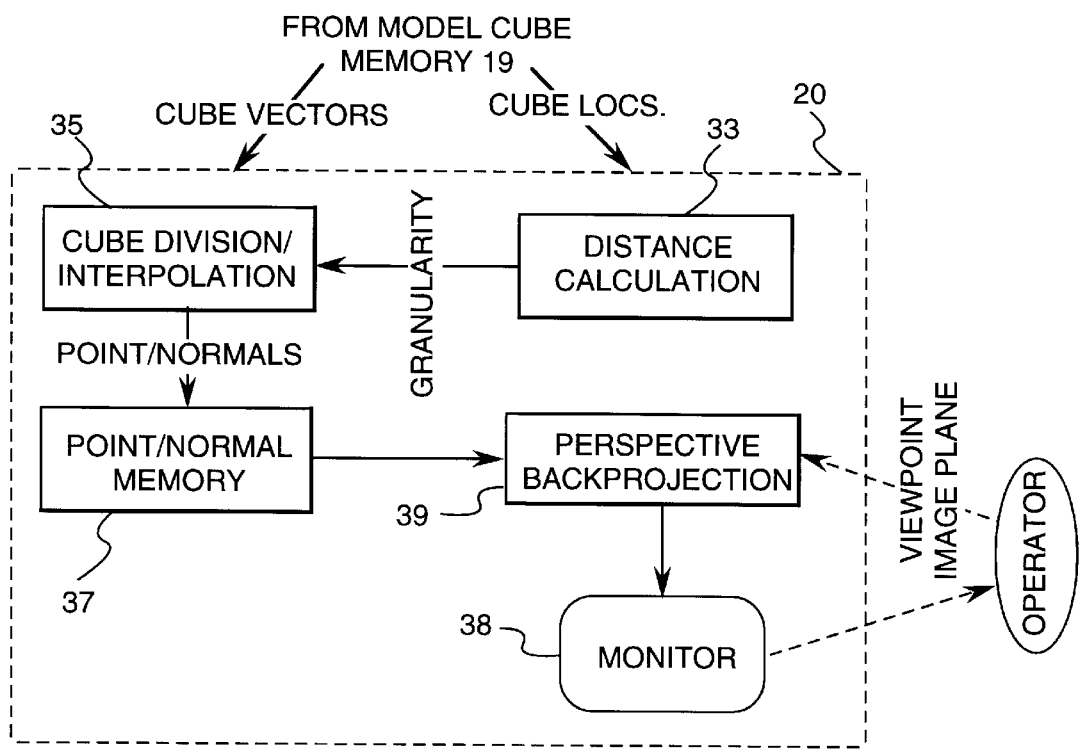
FIG. 4 is simplified block diagram of a dividing cubes with perspective rendering system embodiment according to the present invention.

FIG. 4 shows an apparatus which can display the model cube memory in a fashion using the dividing cubes method and perspective. A distance calculation unit 33 employs a predetermined viewpoint, or receives it from an operator. Similarly, an image plane location and orientation may be provided by an operator, or calculated from the viewpoint. One such simple means would be to have the image plane perpendicular to a ray passing through it and the viewpoint, and spaced a predetermined distance apart. Distance calculation device 33 also receives the cube locations from model cube memory 19.

The distance calculation unit 33 then determines the distance of surface cubes from the viewpoint. These distances for each of the model cubes may be used to determine the granularity of the cube subdivision as described in the previous section.

This granularity is provided to a cube division and interpolation device 35 which reads the cubes and normals from the model cube memory 19 and divides each of the cubes according to its defined granularity. Each subdivided cube is then reduced to a central point and a normal vector is interpolated at that central point for each of the subdivided cubes. The point normal information of each subdivided cubes is then stored in a point normal memory 37.

A perspective back projection device 39 reads the point normal information from the point normal memory 37 and back projects the point normal information to the image plane in order to create a video signal representing a perspective image. Perspective backprojection device 39 provides the video signal to a monitor 38 which creates a visual image to an operator.

In creating this video signal, perspective back projection device 39 may also create a video signal representing surfaces with varying degrees of transparency which may be stored with each surface in the model cube memory 19. For example, superficial surfaces such as skin of the human subject may be displayed but in a semitransparent fashion such that a ghost image of the skin appears to surround underlying structures. Surfaces may be cut away by making the surfaces totally transparent such that underlying surfaces may be visible.

Many times during the perspective back projection, subdivided cubes do not exactly impinge upon the center of each image plane pixel and may cause some distortion. Therefore, another method, and apparatus, may be used to insure that each model value back projects to the center of an image pixel.

Figure 5:
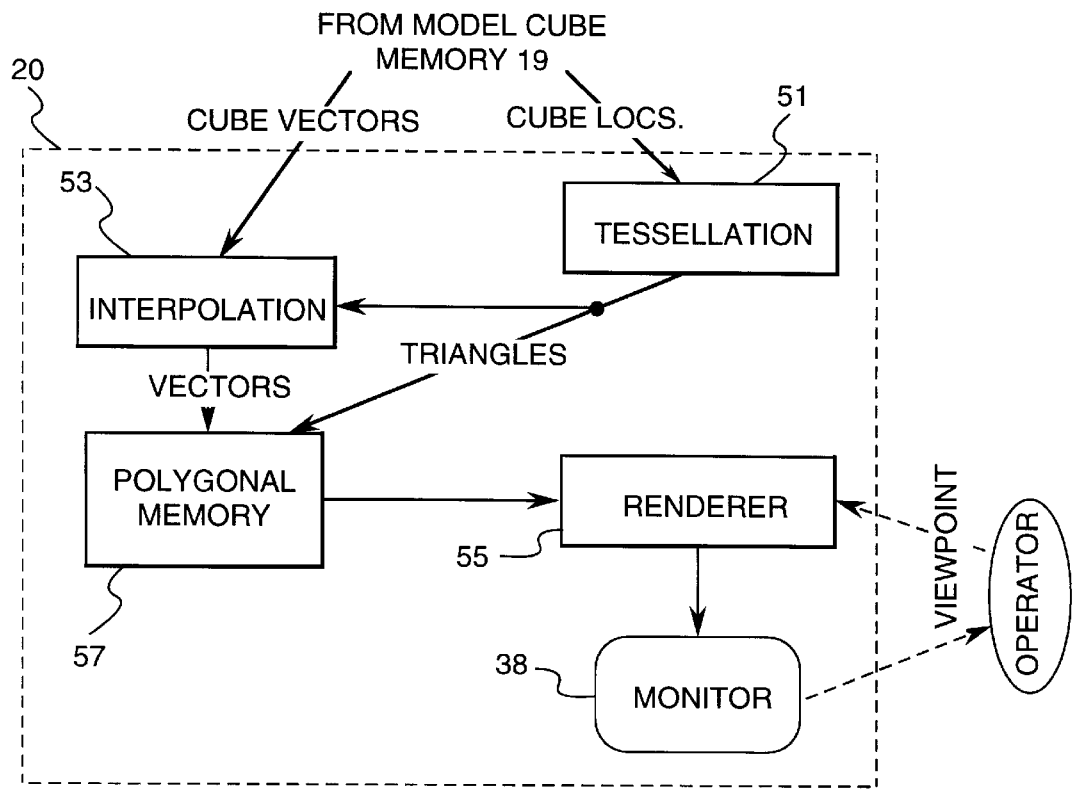
FIG. 5 is a simplified block diagram of an embodiment of a polygonal display rendering system according to the present invention.

Since the model is stored as a cube model with gradient vectors, it may also be easily converted into the form of a conventional computer graphic model. In FIG. 5 an alternative display device is shown. The model cubes and their gradient vectors are provided from model cube memory 19 to a tessellation device and an interpolation device 53, respectively. Tessellation device 51 analyzes which vertices are above a threshold being measured and which are below, then performs a table look-up to convert the cube into surface triangles, as described in the Marching Cubes patent above. These triangles are then provided to any interpolation device 53 which interpolates the gradient vectors associated with each model cube to provide normal vectors at each of the vertices of the triangles. These triangles and normal vectors are provided to a renderer 55 which also receives a viewpoint from which to view the model. Renderer 55 may be any type of conventional renderer which can create a video signal representing a computer graphic models such as the tessellated, wire-frame models common to CAD/CAM models.

Renderer 55 provides the video signal to a monitor 38, similar to that of FIG. 4, which creates an image to an observer.

Since the model cubes are stored in the general format which may be displayed by the devices shown in FIGS. 4 and 5, it is very versatile. This allows display by a perspective dividing cubes method or by conventional CAD/CAM device commonly available.

While several presently preferred embodiments of the present novel invention have been described in detail herein, many modifications and variations will now become apparent to those skilled in the art. It is our intent therefore, to be limited only by the scope of the appending claims and not by the specific details presented by way of illustration.

What we claim is:

1. A system for display of interfaces within a block of raw data values at defined locations comprising:

a) a threshold comparison device for receiving said raw data values, and an input threshold, being capable of identifying which of the data values are above the threshold and which are below the threshold;

b) a model cube memory capable of storing data provided to it and retrieving it at a later time;

c) a surface cube identification device coupled to the model cube memory, functioning to receive the output of the threshold comparison device, and group adjacent data values into vertices of a cube, identify cubes having at least one vertex above the threshold and at least one vertex below the threshold as surface cubes, and store the surface cubes and their locations in the model cube memory;

d) a gradient vector calculation device functioning to receive the raw data values, the surface cubes and their locations, compute a difference in data values a defined distance in front of, and behind, a vertex of a surface cube to result in a first component of a gradient vector, a difference in data values a defined distance above, and below, the vertex to result in a second component, and compute a difference in data values a defined distance to the left and right of the vertex, for all vertices of all surface cubes, and store the components of the gradient vectors associated with each vertex in the model cube memory as a cube/vector model; and e) a display device functioning to display the cube/vector model as a surface representing said interface comprising:

i. a distance calculation device coupled to the model cube memory, functioning to receive a viewpoint from which to view the model, an image plane location, and pixel size w from an operator, and calculates a distance of each cube from the viewpoint, a degree of subdivision (granularity) of the cubes related to each cube's distance from the image plane, the distance of the image plane from the viewpoint, and the pixel width w;

ii a point/normal memory capable of storing center points and vectors associated with each representing a surface of the model, for later retrieval;

iii. a cube division/interpolation device coupled to the model cube memory, functioning to receive the granularity of each of the cubes from the distance calculation device and subdivide each cube according to its granularity, interpolate the vertices of each cube to a center point of the cube, and interpolate the gradient vectors to result in a gradient vectors associated with each center point, and storing each center point and associated vector in the point/normal memory:

iv. a monitor that creates a visual image of a video signal provided to it; and v. a perspective backprojection device coupled to the point/normal memory for receiving the viewpoint and image plane locations, and for producing a video signal from the center points and associated vectors representing a surface of the model as viewed from the viewpoint, and functioning to provide this video signal to the monitor.

2. A display device for display of interfaces within a cube/vector model having a plurality of cube vertices each having an associated cube vector, comprising:

a) a model cube memory capable of storing data provided to it and retrieving it at a later time;

b) a distance calculation device coupled to the model cube memory, functioning to receive a viewpoint from which to view said model, an image plane location, and pixel size w from an operator, and calculates a distance of each cube from the viewpoint, a degree of subdivision (granularity) of the cubes related to each cube's distance from the image plane, the distance of the image plane from the viewpoint, and the pixel width w;

c) a point/normal memory capable of storing center points and vectors associated with each representing a surface of the model, for later retrieval;

d) a cube division/interpolation device coupled to the model cube memory, functioning to receive the granularity of each of the cubes from the distance calculation device and subdivide each cube according to its granularity, interpolate the vertices of each cube to a center point of the cube, and interpolate the gradient vectors to result in a gradient vectors associated with each center point, and storing each center point and associated vector in the point/normal memory;

e) a monitor that creates a visual image of a video signal provided to it; and f) a perspective backprojection device coupled to the point/normal memory for receiving the viewpoint and image plane locations, and for producing a video signal from the center points and associated vectors representing a surface of the model as viewed from the viewpoint, and functioning to provide this video signal to the monitor.

* * * * *